US005769798A

United States Patent [19]

Frajdenrajch

[11] Patent Number: 5,769,798

[45] Date of Patent: Jun. 23, 1998

[54] MASSAGE APPARATUS WITH ROTATABLE MASSAGE HEAD HAVING ELASTIC SUPPORTS

[76] Inventor: Jean Frajdenrajch, 28 rue Saint-Rome, 31000 Toulouse, France

[21] Appl. No.: 564,447

[22] Filed: Nov. 29, 1995

[30] Foreign Application Priority Data

Nov. 30, 1994 [FR] France .................................. 94 14491

[51] Int. Cl.[6] .............................. A61H 15/00; H02K 7/10

[52] U.S. Cl. ............................ 601/112; 601/87; 601/126; 601/128; 601/103; 310/750

[58] Field of Search ................................ 601/85, 87, 102, 601/103, 112, 113, 114, 122, 123, 125, 126, 127, 128, 129, 130, 135; 310/75 D

[56] References Cited

U.S. PATENT DOCUMENTS

| | | | |
|---|---|---|---|
| 855,342 | 5/1907 | Richmond | 601/87 |
| 891,776 | 6/1908 | Kirby | 601/87 |
| 912,016 | 2/1909 | Miller | 601/85 |

FOREIGN PATENT DOCUMENTS

| | | | |
|---|---|---|---|
| 1246834 | 10/1960 | France | 601/87 |
| 1 262 160 | 4/1961 | France . | |
| 181847 | 3/1907 | Germany | 601/112 |
| 1 616 169 | 3/1971 | Germany . | |
| 2 238 563 | 9/1973 | Germany . | |
| 221983 | 9/1924 | United Kingdom | 601/85 |
| 451043 | 7/1936 | United Kingdom | 601/85 |
| WO 92/16178 | 10/1992 | WIPO . | |

*Primary Examiner*—Danton D. DeMille

*Attorney, Agent, or Firm*—Oblon, Spivak, McClelland, Maier & Neustadt, P.C.

[57] ABSTRACT

A massage apparatus includes a motor driving in rotation a drive shaft and a massage head. Supports for the massage head are adapted to allow axial movement and angular displacement of the massage head relative to the drive shaft. Furthermore, the radial and axial supports are fitted so as to actuate the massage head towards a stable equilibrium position and to permit axial movement and angular displacements of the massage head from the equilibrium position.

14 Claims, 4 Drawing Sheets

MASSAGE APPARATUS WITH ROTATABLE MASSAGE HEAD HAVING ELASTIC SUPPORTS

BACKGROUND OF THE INVENTION

1. Field of the Invention

The invention concerns an improved massage apparatus and, in particular the improvements provided for massage appliances such as have been described in the French patent No. 1,262,160 and the appended certificates FR 79910 and FR 85015.

2. Discussion of the Background

The aforesaid massage appliances, described notably in French patent 1,262,160 and the appended certificates FR 79910 and FR 85015 comprise principally a motor, a fitted drive shaft, rotatably driven by the motor, a massage head, carrying the massage fittings and comprising a central bore enabling it to be mounted around the driving shaft, and massage head support means adapted so that the latter is fixed, in rotation, to the drive shaft.

Although the effectiveness of such massage appliances is satisfactory, this established fact being recognized by their irrefutable commercial success over numerous years, nevertheless, the appliances have been found to have certain disadvantages. Indeed, in the first place, risks of traumatism of the tissues, although slight, cannot be totally excluded, particularly when the massage fittings come in contact with bony ridges. Furthermore, it has been observed that the effectiveness of the massage has not always been constant.

SUMMARY OF THE INVENTION

The object of the present invention is to solve the aforesaid disadvantages of massage appliances and aims at providing an improved massage apparatus removing all risks of traumatism of the tissues.

Another object of the invention is to provide a massage apparatus that enables a very effective massage to be obtained under all circumstances.

A further object of the invention is to provide a massage apparatus, the head of which can be easily changed.

To this end, the invention aims at a massage apparatus of the type described in the preamble above and is characterized in that:

- the support means for the massage head comprises upper and lower abutment fittings, arranged in such a way that allows axial movement of said massage head relative to the drive shaft,
- the central bore of the massage head and the drive shaft have shapes adapted so as to allow said massage head to be subject to angular displacements in any direction relative to said drive shaft
- radial and axial elastic support means are adapted, on the one hand, to actuate the massage head to a stable position of equilibrium relative to the drive shaft and, on the other hand, to allow the angular displacements and the axial movements relative to said massage head and to said drive shaft from said position of equilibrium.

The design of such a massage apparatus leads to the creation of a floating massage head which allows the massage fittings to provide an elastic support with displacement in both axial and radial directions. For this reason, the fittings adapt themselves perfectly to the surfaces being massaged and all risks of traumatism of the tissues, notably on projections and ridges, is excluded.

According to another feature of the invention, the motor for this massage appliance is a direct current motor linked to an endless screw gear head. Such a combination of a direct current motor with an endless screw gear head allows the massage head to be given a fixed speed of rotation, whatever the load, thereby securing an effective massage under all conditions.

According to one preferred embodiment, the elastic support means include at least one axial elastic support fitting interposed between the massage head and at least one abutment fitting, and at least one radial elastic support fitting accommodated inside the bore of said massage head, around the drive shaft.

Furthermore, according to another characteristic of the invention, the bore in the massage head has the longitudinal shape of two opposed cones separated by a neck, of a section conjugate with that of the drive shaft, each of said cones being of increasing section in the direction of one end of said bore, and each radial elastic support fitting being located proximate to said ends of the bore.

In addition, the drive shaft has part of its length, intended to be accommodated in the bore of the massage head, with a polygonal section, said bore having a conjugate internal polygonal shape.

This arrangement allows the provision, in a very easy manner, of the facility for axial and angular displacement of the massage head, and permits, furthermore, the making, at low cost, of a massage apparatus, the massage head of which can be easily changed.

To this end and in an advantageous way, the lower abutment fitting is made up of at least one element of a shape adapted to come into abutment with the massage head at the neck of the bore, each of said elements being capable of moving radially in an elastic and reversible fashion under the effect of actuation resulting from an axial load of predetermined intensity exerted on the massage head.

According to this embodiment, changing the massage head simply requires a pulling force to be exerted on the massage head mounted on the appliance in a way such that the lower abutment fitting is moved radially due to the force being exerted upon it by the neck of the bore. Mounting a new massage head into place is achieved by a reverse procedure.

Furthermore, according to another characteristic of the invention, the massage appliance comprises a case which encloses the motor and its gear head, provided with an orifice accommodating a bearing through which the drive shaft extends.

Furthermore, this massage appliance preferably includes a propeller mounted on the output shaft of the motor, upstream of the endless screw, the case being drilled around the orifice accommodating the drive shaft with apertures for the passage of air agitated by said propeller.

Such a propeller has a double function. On the one hand, it allows cooling of the motor and on the other hand, it supplies a flow of air, heated up by said motor, the action of which is not only physiological but also mechanical since it leads to the dispersion of material raised when the massage fittings are in contact with the skin.

BRIEF DESCRIPTION OF THE DRAWINGS

Other characteristics, aims and advantages of the invention will emerge from the detailed description which follows with reference to the appended drawings which represent by way of a non-limiting example one preferred embodiment. In these drawings which form an integral part of the description.

DESCRIPTION OF THE PREFERRED EMBODIMENTS

Figure 1:
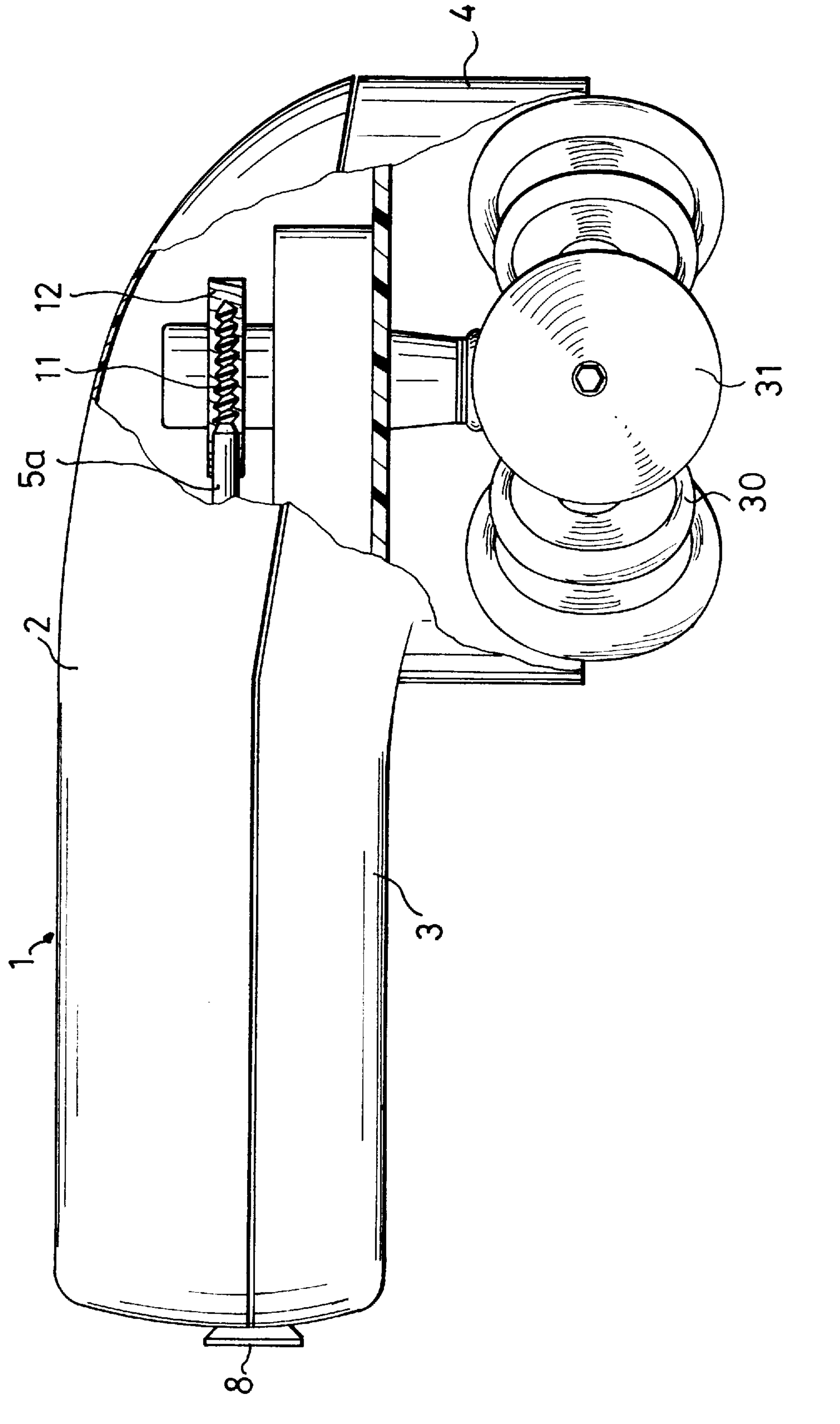
FIG. 1 is a longitudinal view, with the case partly cut away of a massage appliance in accordance with the invention.
Figure 2:
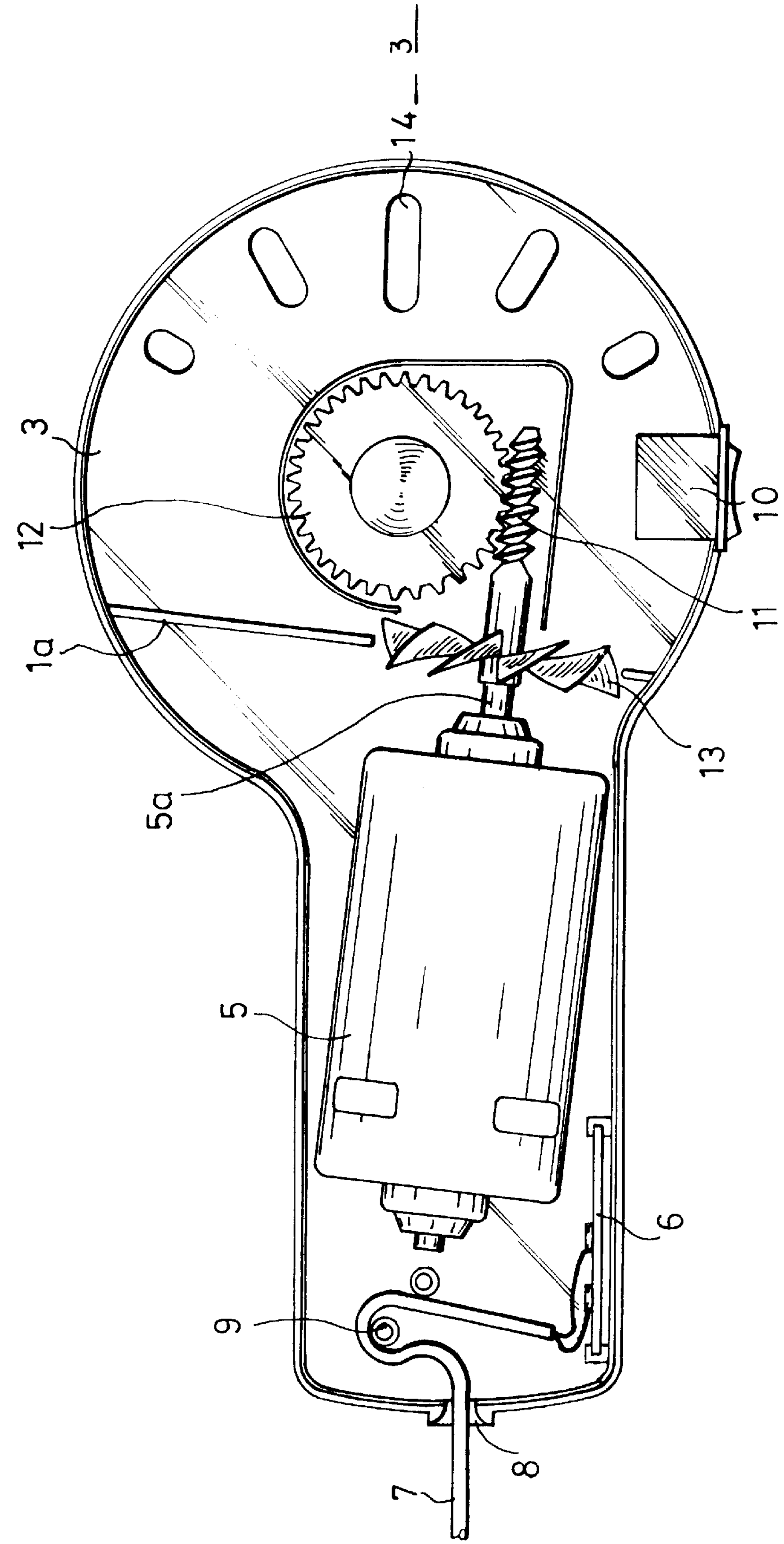
FIG. 2 is a view from above of the inside of this massage appliance.

The massage appliance shown in FIGS. 1 and 2 displays the essential feature of having a floating massage head.

This massage appliance is in the form of a case 1 made up of two half cases 2, 3 forming an ergonomic handgrip allowing the appliance to be manipulated with only one hand. This case 1 further comprises a housing accommodating the various components (i.e. electric motors, etc.), the internal arrangement of which is adapted to ensure that each of said components is held in position.

In addition, this case is fitted on the underside of the housing with a cylindrical wall 4 fitted so that it extends around the massage head, over part of the height of the latter.

The massage appliance includes, in the first place, a direct current motor 5 housed in case 1. This motor 5 is supplied with electric power through an electronic card 6 connected to an electric cable 7 to be connected to an electric outlet. This electric cable 7 passes into the case through an orifice 8 provided in this case and is gripped by a chicane system 9 for avoiding any risk of disconnection.

The electronic card 6 is, moreover, connected to a switch 10, said card and switch being suitable to allow two rotary speeds to be selected for motor 5.

Furthermore, the massage appliance comprises, joined to motor 5, a gear head consisting of an endless screw 11 extending into the drive shaft extension 5*a* of said motor and a toothed wheel 12 engaging with said endless screw.

In addition, the massage appliance incorporates, also joined to motor 5, a propeller 13, mounted on the output shaft 5*a* of said motor, upstream from the endless screw 11. This propeller 13 is fitted to create a flow of air suitable to ensure the cooling of motor 5, and to deliver the flow of warmed air towards the massage head, through apertures 14 provided in the half case 3, in such a way that the interior of case 1 and the volume defined by the cylindrical wall 4 are brought into communication.

In addition, in order to allow the creation of this flow of air, case 1 comprises, to the right of propeller 13, an internal transverse wall 1*a*, separating the interior of said case into two compartments, upstream and downstream of said propeller.

The massage appliance also comprises a support which includes a drive shaft 15 for the transmission of the rotary movement of the motor/gear head assembly to the massage head. For that purpose, the top end of this drive shaft 15 is knurled and is mounted inside a blind hole 12*a* provided axially in the core of the toothed wheel 12.

This drive shaft 15 extends to the exterior of case 1 through an orifice in the latter, provided axially relative to cylindrical wall 4. In addition, the wall of case 1 is so shaped, at the level of this orifice, that it forms a sleeve 16 in the interior of which a bearing 17 is housed.

The opposite lower end of drive shaft 15 consists of a threaded section 15*b*, with a diameter smaller than that of the upper section 15*a*, on which a shaft end fitting 18 is fitted such that it extends into the lower extension of said drive shaft 15, and the dismounting capacity of which is designed to allow the fixing of elastic support or abutment fittings described below.

Figure 3:
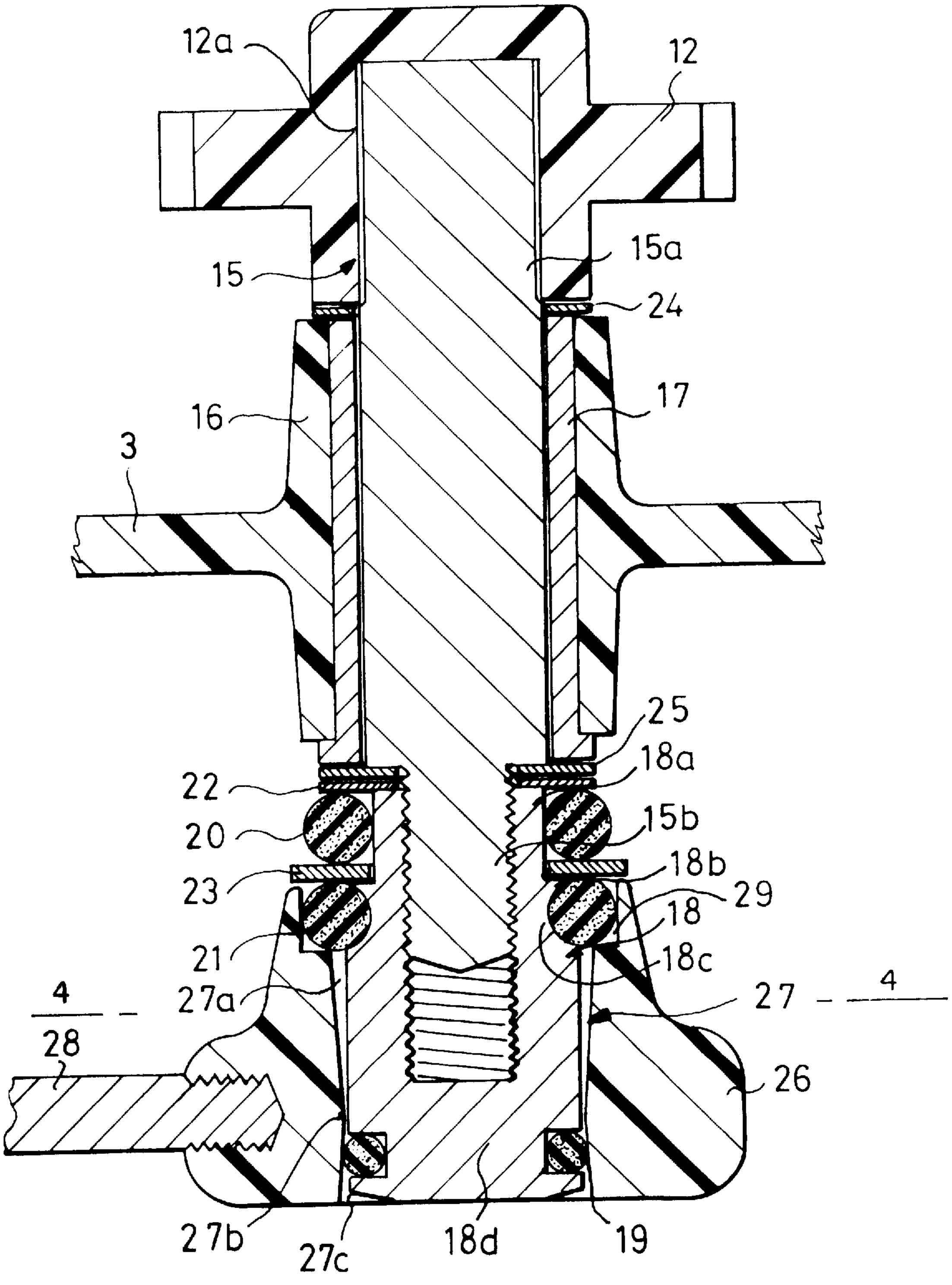
FIG. 3 is a longitudinal cross-sectional view taken along a plane 3 and on an enlarged scale showing the link between the drive shaft and a massage head.
Figure 4:
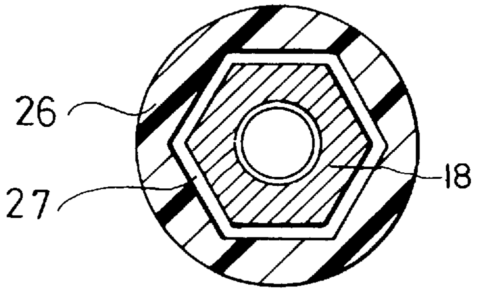
FIG. 4 is a cross-sectional view taken along plane 4—4 in FIG. 3, and FIGS. 5 and 6 are perspective views of two variants of massage heads which can be fitted to the massage appliance according to the invention.

This shaft end fitting 18 is divided longitudinally into three portions which can be recognized by referring to FIG. 3: an upper cylindrical portion 18*a* with a cross section somewhat smaller than that of the upper portion 15*a* of drive shaft 15, an intermediate portion 18*c* consisting of an annular groove of semi-cylindrical cross section, separated from the upper portion 18*a* by a shoulder 18*b*, and a lower portion 18*d*, of a length much greater than that of the two other portions having an hexagonal cross section.

Furthermore, this lower portion 18*d* includes, at a short distance from its lower end, an annular groove accommodating an O-ring 19 of such a thickness that it partially projects to the exterior of this groove.

The elastic support fittings referred to above consist of two O-rings 20, 21 which respectively allow axial and angular displacements of the massage head. The first O-ring 20, forming the axial elastic support fitting is located around the upper portion 18*a* of the shaft end fitting, and is held between two washers 22, 23, one of said washers 22 being pinched between drive shaft 15 and shaft end fitting 18, and the other washer 23 resting on the shoulder 18*b* of said shaft end fitting.

The second O-ring 21 forming the radial elastic support fitting is accommodated in the annular groove formed by the intermediate portion 18*c* of shaft end fitting 18, and has a thickness suited to partially project to the exterior of this groove.

In addition, two anti-friction washers 24, 25 are located around drive shaft 15, the upper part of washer 25 and the lower part of washer 25 being in contact with bearing 17.

The massage heads designed to be fitted to such a massage appliance are all made up of a central boss 26 into which a bore of hexagonal cross section 27 is provided, capable of allowing said massage heads to be fitted and of arms such as arm 28, for example, three in number, uniformly distributed, extending radially with respect to the axis of bore 27, each of said arms being made up of a shank carrying at least one massage fitting.

Furthermore, the hole bored in the boss 26 has the longitudinal shape of two opposed cones 27*a*, 27*c* separated by a neck 27*b* of a cross section conjugate with that of the lower hexagonal portion 18*d* of shaft end fitting 18, each of said cones increasing in section in the direction of one end of the bore 27.

In addition, this bore 27 comprises a spotfacing 29 at its upper end for accommodating the part of the O-ring 20 projecting radially to the exterior of the annular groove making up the intermediate portion 18*c* of the shaft end fitting 18.

Furthermore, central boss 26 has, at spotfacing 29, an upper portion of annular shape with dimensions such that said boss comes into top abutment against washer 23 when the massage head is put into place.

Such a massage apparatus is designed therefore to allow rapid assembly and disassembly of the massage heads by a simple ratchet, the stop fitting that ensures that the massage heads are held in place being made up of the O-ring 19 the external dimensions of which, without loading, are greater than those of neck 27*b*.

Furthermore, when the massage appliance is being used, the massage heads can undergo, on the one hand, axial displacement by compression of O-ring 20, and on the other hand, angular displacement by compression of O-ring 21, this angular displacement being also permitted by the conical shape of bore 27.

Such possibilities allow perfect adaptation of the massage fittings to the surfaces being massaged to be guaranteed and exclude all risks of traumatism of the tissues. Three examples of massage fittings usable with such a massage appliance are shown in the Figures.

The massage fittings shown in FIG. 1 consist, for each radial arm 28, of spaced apart wheels, in the example, two wheels 30, 31 per arm 28, providing a smooth rolling strip, and made of a rigid material. It should be noted that, as a variant, the rim of these wheels could be made of a rigid material and the rolling strip be made of a flexible material.

Each of these wheels 30, 31 have a central bore, (not seen in the Figures) making up a cross member sleeve, allowing them to be mounted with free rotation around arms 28.

Figure 5:
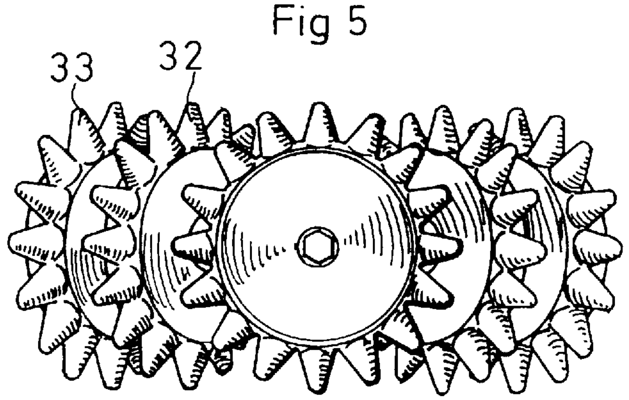

The massage fittings shown in FIG. 5 consist, in this case, of spaced apart wheels, in the example given two wheels 32, 33 per arm 28, having a rolling strip provided with conical teeth made of a flexible material. In accordance with another embodiment these teeth can be replaced by small suction discs.

Figure 6:
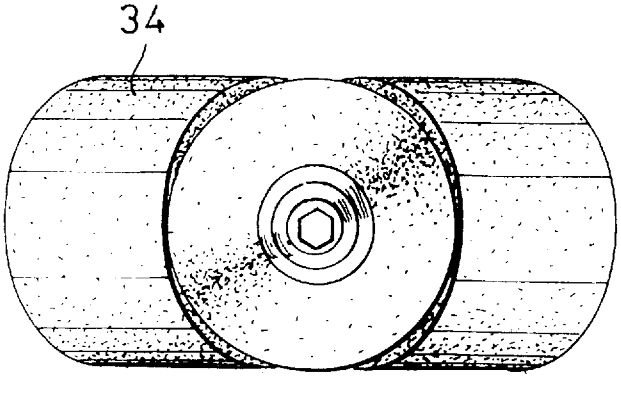

Finally, the massage fittings shown in FIG. 6 consist, for each radial arm 28, of a roll 34, made of a foam material.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A massage apparatus, which comprises:

a motor, a rotatable drive shaft driven in rotation by said motor, a rotatable massage head carrying massage fittings and including a central bore enabling the head to be mounted on the drive shaft and be rotatable with said drive shaft, and a support supporting the massage head in order to rotate said massage head by said drive shaft:

the massage head support including an upper abutment fitting and lower abutment fitting permitting axial movement of said massage head relative to the drive shaft, the central bore of the massage head and the drive shaft being shaped so as to allow said massage head to undergo angular displacements in all directions relative to said drive shaft, radial and axial elastic supports which, on the one hand, provide the massage head with stable equilibrium position relative to the drive shaft, and on the other hand, permit angular displacements and axial displacements relative to said massage head and said drive shaft from said equilibrium position.

2. A massage apparatus, according to claim 1, wherein the elastic support includes at least one axial elastic support fitting interposed between the massage head and at least one of the upper and lower abutment fittings, the at least one radial elastic support fitting being located inside the bore of said massage head, around drive shaft.

3. A massage apparatus according to claim 2 wherein the elastic support fittings comprise O-rings.

4. A massage apparatus according to claim 2 wherein the bore in the massage head longitudinally has the shape of two opposed cones separated by a neck of a cross section conjugate with that of the drive shaft, each of said cones increasing in cross section in the direction of one end of said bore and each radial elastic support fitting being located proximate to one of said ends of the bore.

5. A massage apparatus according to claim 4 wherein the lower abutment fitting being abuttable with the neck of the bore of the massage head and being movable radially aside in an elastic and reversible manner under an effect of a load arising from an axial force of a predetermined intensity exerted on the massage head.

6. A massage apparatus according to claim 5 wherein the lower abutment fitting comprises an O-ring housed in an annular groove provided in the drive shaft.

7. A massage apparatus according to claim 1 wherein the drive shaft has a length portion thereof accommodated in the bore of the massage head, said length portion having a polygonal cross section.

8. A massage apparatus according to one claim 1 wherein the motor comprises a direct current motor connected to a gear head with an endless screw.

9. A massage apparatus according to claim 8, which comprises a case enclosing the motor and the gear head, said case having an orifice and a bearing housed in the orifice and through which the drive shaft extends.

10. A massage apparatus according to claim 9, which comprises a propeller mounted on the output shaft of a motor wherein the motor is connected to the endless screw, said case being pierced with apertures for the passage of air agitated by said propeller.

11. A massage apparatus according to claim 1 wherein the massage head comprises a boss in which the central bore is provided and a plurality of arms evenly distributed and extending radially with respect to the axis of said bore, each of said arms carrying at least one of the massage fittings.

12. A massage apparatus according to claim 11 wherein the massage fittings include, for each radial arm, spaced apart wheels providing a smooth rolling strip and made of a rigid material, wherein said wheels are mounted so as to rotate freely around said radial arm.

13. A massage apparatus according to claim 11 wherein the massage fittings include for each radial arm spaced apart wheels so as to form a rolling strip equipped with conical teeth made of a flexible material, said wheels being mounted so as to rotate freely around said radial arm.

14. A massage apparatus according to claim 11 wherein the massage fittings include for each radial arm a roller made of a foam material mounted so as to rotate freely around said radial arm.

* * * * *